United States Patent
Adams, III

[11] 3,864,988
[45] Feb. 11, 1975

[54] ENERGY ABSORBING STEERING COLUMN
[75] Inventor: Don Adams, III, Ferndale, Mich.
[73] Assignee: Chrysler Corporation, Highland Park, Mich.
[22] Filed: May 14, 1973
[21] Appl. No.: 360,295

[52] U.S. Cl. .................................. 74/492, 188/1 C
[51] Int. Cl. ............................................. B62d 1/18
[58] Field of Search ............... 74/492, 493; 188/1 C

[56] References Cited
UNITED STATES PATENTS

| | | | |
|---|---|---|---|
| 3,143,321 | 8/1964 | McGehee et al. | 188/1 C X |
| 3,236,333 | 2/1966 | Mitchell | 188/1 C |
| 3,339,674 | 9/1967 | Kroell et al. | 188/1 C |
| 3,528,530 | 9/1970 | Franck et al. | 188/1 C |
| 3,538,785 | 11/1970 | Grancon | 74/492 |
| 3,608,677 | 9/1971 | Wykes | 188/1 C |
| 3,717,046 | 2/1973 | Takao et al. | 74/492 |
| 3,747,427 | 7/1973 | Milton | 74/492 |
| 3,760,650 | 9/1973 | Pardy | 74/492 |
| 3,779,591 | 12/1973 | Rands | 188/1 C |

Primary Examiner—Allan D. Herrmann
Attorney, Agent, or Firm—Talburtt & Baldwin

[57] ABSTRACT

Collapsible steering column for an automotive vehicle including a polygonal shaped jacket having a plurality of rows of elongated slots therein, and a die member attached to the vehicle floorboard for folding the jacket walls back upon themselves upon impact.

3 Claims, 8 Drawing Figures

ENERGY ABSORBING STEERING COLUMN

BACKGROUND OF THE INVENTION

This invention relates to steering column assemblies, and more particularly to energy absorbing collapsible steering column assemblies for automotive vehicles. It is related to an energy absorbing steering column disclosed in U.S. Pat. application Ser. No. 360,294, filed May 14, 1973.

Collapsible energy absorbing steering columns of various types have been known for many years and have taken various forms. For example, many early types of columns utilized telescoping members having hydraulic fluid therein which passed through one or more parts as the members telescoped. Another type developed recently included a column jacket having circumferentially arranged diamond-shaped openings forming a mesh which collapsed under a predetermined load. Another type recently developed includes a pair of telescoping jacket members having balls between the walls thereof, the balls having an interference fit with the walls and causing deformation of one or both members when subjected to a predetermined load. Still another type is described in U.S. Pat. No. 3,339,674. This type utilizes a tubular member which is telescoped axially upon itself to progressively radially bend the walls and then reverse such walls axially of the tube. The present invention is generally of the latter type although it is different in construction as well as improved.

BRIEF SUMMARY OF THE INVENTION

Briefly, this invention comprises a steering column having a slotted polygonal-shaped jacket and a die member for deforming the jacket.

One of the primary objects of this invention is to provide an energy absorbing steering column for an automotive vehicle.

Another object of this invention is to provide a collapsible steering column of the type described which provides a controlled resistance to collapse for absorbing energy.

A further object of this invention is to provide a collapsible steering column of the class described which has high bending strength, while being collapsible at the aforenoted controlled rate.

Another object of this invention is to provide a collapsible steering column such as described, which will collapse in a predetermined manner upon impact of a predetermined magnitude.

A further object of this invention is to provide a collapsible steering column of the type described the resistance to collapse of which gradually increases to a predetermined level and then remains generally at that level.

A further object of this invention is to provide a collapsible steering column which results in energy absorption by the opening of a mesh with a die.

Another object of this invention is to provide a collapsible steering column which is slotted in a particular manner to provide high bending strength in the column.

Still another object of this invention is to provide a collapsible steering column of the class described which is economical in construction and effective in operation.

Other objects and advantages of this invention will be made apparent as the description progresses.

BRIEF DESCRIPTION OF THE DRAWINGS

In the accompanying drawings in which one of various possible embodiments of this invention is illustrated.

Like parts are indicated by corresponding reference characters throughout the several views of the drawings.

DESCRIPTION OF THE PREFERRED EMBODIMENT

Figure 1:
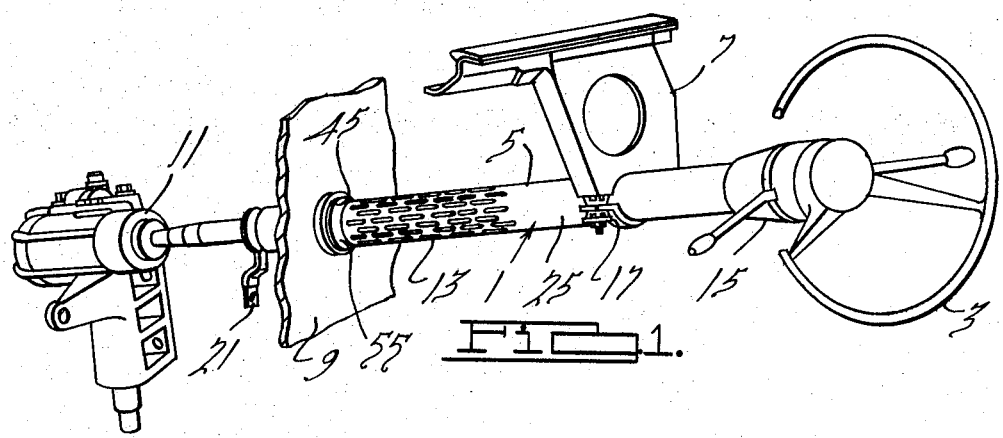
FIG. 1 is a fragmentary pictorial view of a steering column constructed in accordance with this invention.

Referring to the drawings, a steering assembly constructed in accordance with this invention is shown generally in FIG. 1 at 1. Assembly 1 includes a steering wheel 3 mounted at the upper end of a steering column 5. Column 5 extends downward past an instrument panel 7 and through a cowl or firewall 9 to a steering sector 11.

Column 5 includes a jacket 13 which extends from a steering wheel hub 15 to the firewall 9 and is connected to the instrument panel 7 by releasable clamping brackets 17. A multi-piece shift tube 19 extends from the hub 15 downwardly through the jacket to a shift lever 21 located below the firewall 9. A multi-piece steering shaft 23 is connected at its upper end to the steering wheel 3 and extends downwardly through the shift tube 19 to the steering sector 11. The shift tube 19 and shaft 23 may be of the general type shown in U.S. Pat. No. 3,373,629 and are adapted to telescope upon themselves under a predetermined load.

Jacket 13 is formed of a sheet metal blank rolled into a column having a relatively stiff or rigid upper portion 25 and an energy absorbing portion 27. The upper portion 25 is generally circular, but the lower energy absorbing portion 27 is generally polygonal in shape. More specifically, the energy absorbing portion 27 has a plurality of longitudinally extending rows 29 of longitudinally extending slots 31 spaced around the perimeter of the jacket. The slots 31 of each row have radiused ends 33 to reduce the incidence of stress risers and are separated from one another by webs 35. The long side walls 37 formed between the rows 29 of slots 31 are generally flat and are approximately the same width as the slots. The slots of each row are offset in a longitudinal or axial direction by a distance equal to approximately one-half the length of the slots. The lower end of the column jacket is formed so that, with the exception of the end slot in five of the rows, the end slots of alternative rows are open and the slots themselves extend up the jacket approximately one-half of the normal length of the slots. The five end slots referred to above are shorter than the remaining end slots to provide enlarged webs 39.

The lower end of the jacket 13 is connected by a plurality of rivets 41 to the upper end of a stamped mandrel 43. The mandrel is tubular in shape and extends through an opening 45 in firewall 9.

The rearward end of the mandrel 43 extends into the lower portion of the jacket 13, and as mentioned previously, is attached thereto by the rivets 41. A die portion 55 is formed by folding the mandrel upon itself and provides a 90° arc or curved portion 57.

The curved portion is tangent at its rearward end to the forward end of the tubular portion of the mandrel and curves outwardly therefrom.

Figure 2:
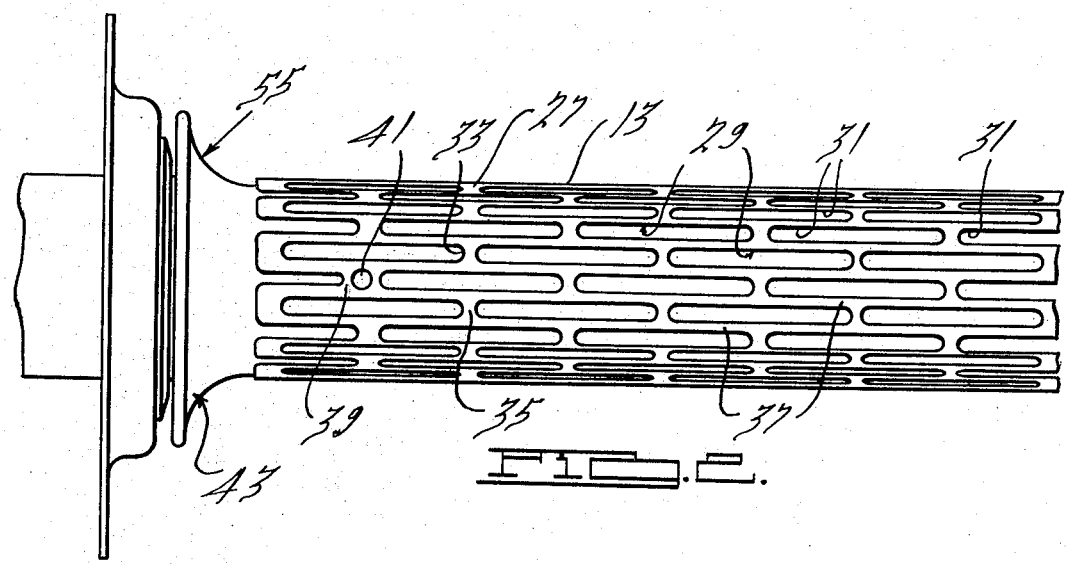
FIG. 2 is an enlarged fragmentary side elevation of the column shown in FIG. 1.
Figure 3:
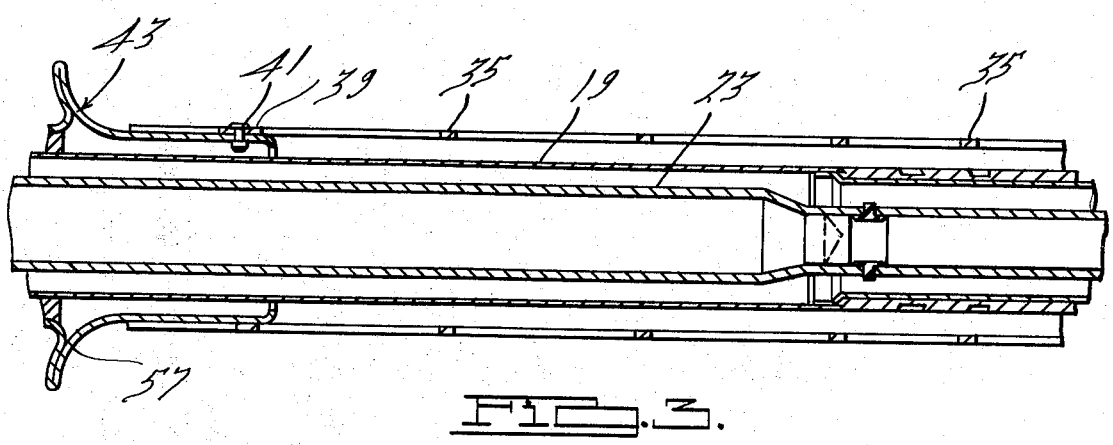
FIG. 3 is a longitudinal section of the column shown in FIG. 2.
Figure 4:
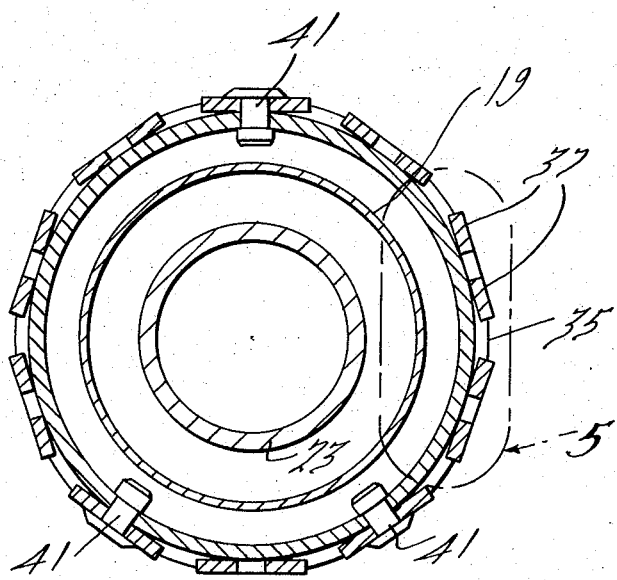
FIG. 4 is an enlarged section taken along line 4—4 of FIG. 3.
Figure 5:
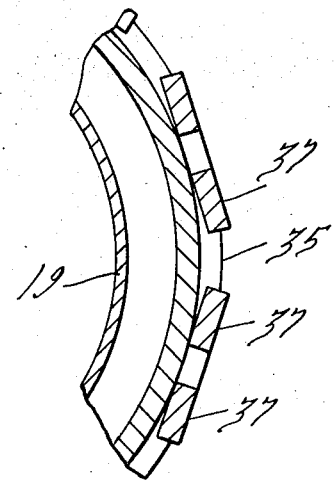
FIG. 5 is an enlarged fragmentary view of FIG. 4.

Assuming the various components of the steering column are in the position shown in FIGS. 1, 2 and 3, operation of the column is as follows:

If a force of sufficient magnitude is applied to the steering wheel by the driver, for example, the clamps 17 will be released and the column will move downwardly due to the axial component of the force. First, the rivets 41 will hold the mandrel 43 and jacket 13 together, causing the mandrel to move downwardly and forwardly. When the curved die portion 55 engages firewall 9, the die portion will stop. If the force on the column is of sufficient magnitude, the shanks of the rivets will shear and the forward end of the column jacket 13 slide toward die portion 55.

Figure 6:
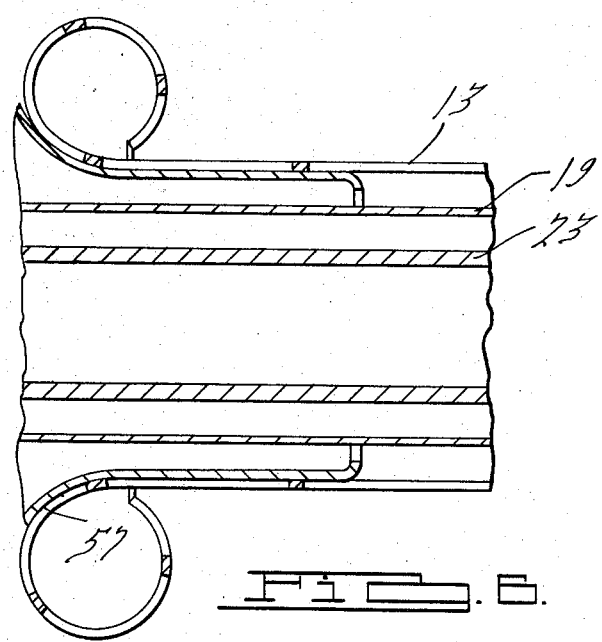
FIG. 6 is an enlarged fragmentary view of FIG. 3 during an initial phase of the reverse bending of the column jacket.
Figure 7:
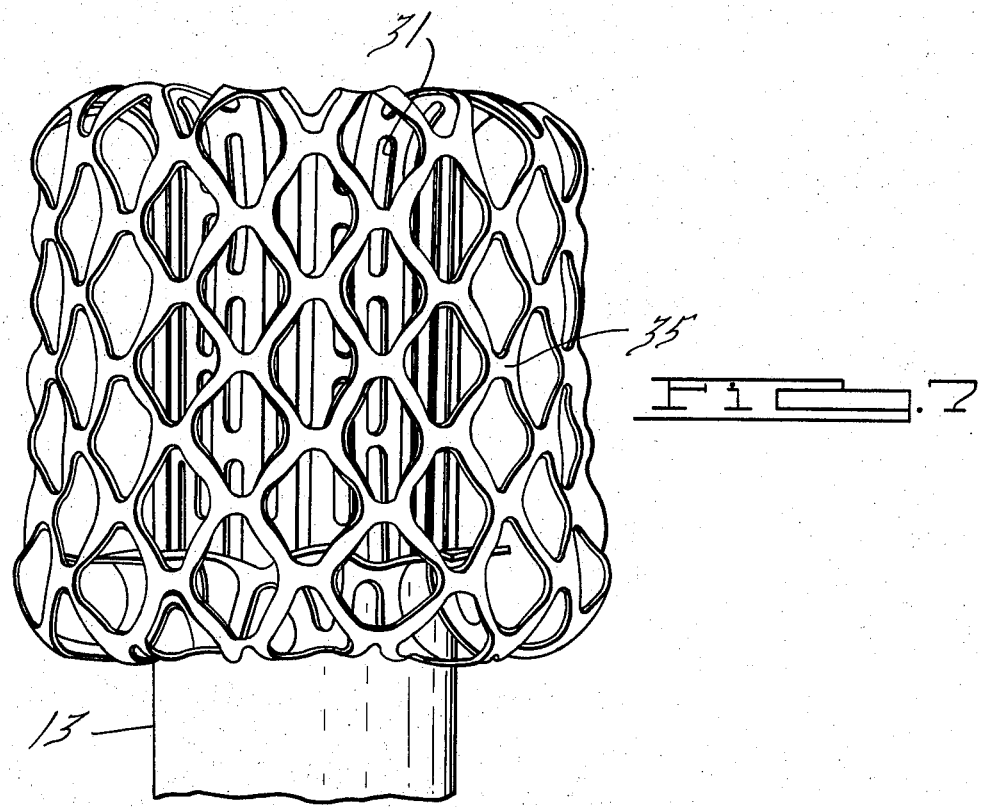
FIG. 7 is an enlarged fragmentary elevation of a column jacket, longitudinally cut down the middle, after the column has been collapsed.
Figure 8:
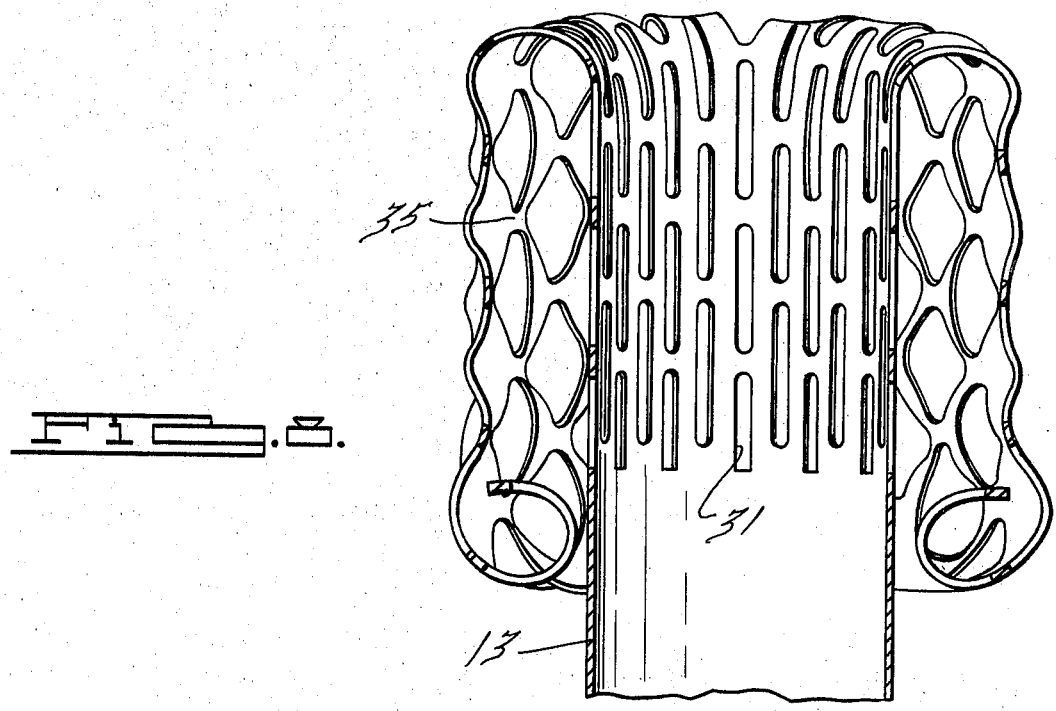
FIG. 8 is a view of FIG. 6 taken from the other side of the column.

Referring now to FIG. 6, as the forward end of the jacket 13 initially engages the die section 55 the jacket walls begin to curl outwardly and then rearwardly upon themselves until the original forward end of the jacket is folded back over 360° and in fact, may approach the 540° curl shown in FIGS. 7 and 8.

As the jacket passes over the die portion 55 and is flared outwardly thereby the slots 31 open up into generally diamond shapes as the walls 37 and webs 35 and 39 bend to allow for the increased perimeter of the jacket. The peripheral continuity of the jacket is altered by the spreading slots as the jacket is flared outwardly by the die.

As the jacket continues to move forwardly the curled end portion moves back along the jacket without further curling. The only additional curling takes place as the walls of the jacket are reversely curled approximately 180° by the die portion 55. In addition, work or energy absorption is obtained by uncurling or straightening the curl as the expanded jacket begins to move back up on the outside of the jacket. The jacket assumes the condition shown in FIGS. 7 and 8 after a predetermined impact has occurred. Energy is absorbed by the reverse bending and curling created by the die portion 55 and the uncurling created by the hoop strength of the expanded jacket.

Until the expanded jacket reaches the position shown in FIG. 6 the resistance to collapse increases to a predetermined level. As further collapse occurs and the jacket goes from the FIG. 6 position to the FIGS. 7 and 8 position the resistance to collapse generally levels off and remains generally constant. This provides maximum efficiency at a desired rate.

The column is relatively rigid and has a relatively high bending resistance since the slots 31 extend longitudinally of the jacket prior to impact. This substantially reduces the possibility of collapse by bending when the driver is thrown against the steering wheel. However, the slots 31 reduce the hoop strength of the jacket and permit the jacket to be flared outwardly by the die portion 55.

In view of the foregoing it will be seen that the several objects and other advantages of this invention are achieved.

Although only one embodiment of the invention has been disclosed and described, it is apparent that other embodiments and modifications of the invention are possible.

I claim:

1. An energy absorbing steering column comprising a steering wheel, a steering shaft connected to said wheel and adapted to extend through an opening in a floorboard of a vehicle, a tubular jacket surrounding said shaft between said floorboard and said steering column, and a die means inside the lower end of said tubular jacket, said die means being connected to said floorboard, said die means, when a force of predetermined magnitude is applied to the upper end of said column, causing said jacket to fold back upon itself, thereby absorbing energy, a plurality of fasteners connecting said die means to said jacket, said fasteners being adapted to shear when the force of the predetermined magnitude is applied to the upper end of the column, said jacket having a plurality of longitudinally extending rows of longitudinal slots, said rows being spaced apart from one another around the perimeter of said jacket, each of said slots having a curved end portion, said slots in each of said rows being separated by relatively short webs, said jacket, between said rows of slots, having a plurality of relatively flat longitudinally extending sides, said webs being curved and joining said sides together.

2. An energy absorbing steering column comprising a steering wheel, a steering shaft connected to said wheel and adapted to extend through an opening in a floorboard of a vehicle, a tubular jacket surrounding said shaft between said floorboard and said steering column, and a die means inside the lower end of said tubular jacket, said die means being connected to said floorboard, said die means, when a force of predetermined magnitude is applied to the upper end of said column, causing said jacket to fold back upon itself, thereby absorbing energy, said jacket having a plurality of rows of longitudinally extending slots separated from each other by elongated flat sides, the jacket being generally polygonal in shape.

3. An energy absorbing steering column as set forth in claim 2 further including rivets connecting said jacket to said die member, said rivets shearing when said jacket is moved relative to said die member.

* * * * *